US008117661B2

(12) United States Patent
Zhang

(10) Patent No.: US 8,117,661 B2
(45) Date of Patent: Feb. 14, 2012

(54) ENCRYPTION BASED SILICON IP PROTECTION

(75) Inventor: Weidong Zhang, Milpitas, CA (US)

(73) Assignee: Weidong Zhang, Milpitas, CA (US)

( * ) Notice: Subject to any disclaimer, the term of this patent is extended or adjusted under 35 U.S.C. 154(b) by 1187 days.

(21) Appl. No.: 11/710,656

(22) Filed: Feb. 26, 2007

(65) Prior Publication Data

US 2008/0208886 A1    Aug. 28, 2008

(51) Int. Cl.
*G06F 21/00*    (2006.01)
(52) U.S. Cl. .............. 726/26; 726/27; 726/28; 726/29; 726/30
(58) Field of Classification Search .............. 707/102; 726/26–30
See application file for complete search history.

(56) References Cited

U.S. PATENT DOCUMENTS

| | | | | | |
|---|---|---|---|---|---|
| 5,615,379 | A | * | 3/1997 | Wehle | 717/110 |
| 5,623,417 | A | * | 4/1997 | Iwasaki et al. | 716/18 |
| 2002/0016948 | A1 | * | 2/2002 | Rein et al. | 716/1 |
| 2007/0111112 | A1 | * | 5/2007 | Huh et al. | 430/5 |
| 2007/0185898 | A1 | * | 8/2007 | Hekmatpour et al. | 707/102 |
| 2007/0201442 | A1 | * | 8/2007 | Hekmatpour et al. | 370/356 |
| 2007/0294658 | A1 | * | 12/2007 | Huang et al. | 716/18 |

* cited by examiner

*Primary Examiner* — Vivek Srivastava
*Assistant Examiner* — Anthony Brown
(74) *Attorney, Agent, or Firm* — Jingming Cai; Schein & Cai LLP

(57) ABSTRACT

A method and system for protecting silicon IPs from unauthorized use, transfer and sale, and for hiding confidential technology information contained in silicon IPs is described. The method and system create a content-encrypted silicon IP layout database from its original layout database. Both the layout database may be GDSII files, OASIS files, or other format layout database file, in which multiple records sequentially build the layout database. In accordance with one preferred embodiment, first, the original layout database is parsed and saved as sequential records in the memory. Next, the structure records, which construct structures in the original layout database, are selected from the saved records. Once the structure records have been selected, the data of the structure records may be compressed with using a public compressing method, and may be encrypted with using a public cryptography algorithm. Next, each byte of the data after compression and encryption is mapped to one or two printable ASCII characters for building up multiple new text element records in a new structure. Finally, the newly created structure records replace the selected structure records in the original layout database to create the content-encrypted silicon IP layout database.

40 Claims, 12 Drawing Sheets

ENCRYPTION BASED SILICON IP PROTECTION

BACKGROUND OF THE INVENTION

I. Technical Field

The present invention relates generally to techniques for protecting integrated circuit intellectual property from unauthorized use. More particularly, the present invention relates to creating content-encrypted silicon IP layout database.

II. Background

Electronic systems are built in large part using standalone, individually packaged chips, which are assembled on printed circuit boards (PCBs) and connected together to obtain the desired functionality. The electronic industry is currently shifting towards a new design paradigm called as SOC, (an acronym for "System on a chip"). Under this paradigm, all the necessary electronic circuit blocks are integrated onto a single chip to come up with a complete electronic system that performs more complex and more useful functions. Compared with the PCB multi-chip systems, the SOC systems usually consume less power, occupy less space and have a lower cost and higher reliability.

Meanwhile, the continuously increasing number of electronic circuit blocks that electronic companies are fitting onto a single chip has been driving the need for a correlating increase in developer productivity. Circuit developers are increasingly acquiring electronic circuit blocks from other sources and incorporating them into their designs as a strategy to enable them to more quickly complete designs and focus their engineering resources on their core competencies. The acquired electronic circuit blocks are alternatively referred to as IPs, (an acronym for "Intellectual Properties"). IP usually by nature has been pre-tested and pre-verified and is reusable, for example, a micro-controller IP in a cellular phone system could be reused in a digital TV set-top box or in an automotive application.

There are mainly two types of IPs. One type is software IP. Software IP, which is commonly presented in the form of a HDL (hardware description language) file, provides functional description of a circuit design. Another type of IP is silicon IP. Silicon IP, which is presented in the form of a layout database, such as GDSII file or OASIS file, is specific in a certain foundry technology and provides layout mask level description of a circuit design. Silicon IP is always silicon-proven, which means, it already has a successful wafer fabrication and has a satisfied yield rate of production. For the same functionality circuit design, compared with software IP, silicon IP requires electronic companies to put much more time and much more financial and engineering resources to achieve.

Since silicon IP is presented in GDSII (Graphic Data System II), OASIS (Open Artwork Systems Interchange Standard), or other format layout database electronic files and physically exist on magnetic storage devices, the silicon IP is relatively easy to copy, forge and re-design. Moreover, the increased efficiency brought about by the existence of silicon IPs also provides an incentive for unauthorized use, re-use transfer or sale of these items. Silicon IP providers, are therefore in need of an effective method of protecting their designs, so that they are not deprived of the benefits of the resources spent in silicon IP design development. Additionally, silicon IP is foundry technology specific, which may expose confidential technology information of the foundry. Silicon IP providers also receive essential requests from the foundry to find an effective method to hide the confidential foundry information in their silicon IPs.

Traditionally, silicon IP protection has largely been through legal means such as non-disclosure agreements, patents or copyrights. By themselves, however, such legal means are of limited use, because detection of illegal copying, forging, transfer or re-use of proprietary silicon IPs is difficult. It can be challenging to determine whether a silicon IP was illegally acquired by a particular user. The user, for example, may make superficial changes to the silicon IP to disguise its illicit source. Furthermore, the costs involved in preventing unauthorized copying, re-use or transfer of silicon IPs, and in discovering whether particular silicon IPs have been illegally acquired, can be excessive.

One conventional method, which has been used in an attempt to protect silicon IP, is a technique known as "tagging." Tagging involves the creation of an electronic document containing information about the ownership of the silicon IP. The electronic document, in text form, is typically embedded into the silicon IP at the layout mask level. However, because text at the mask level may be easily removed, tagging is not especially effective.

Another method used to protect silicon IP is a "watermarking" technique. Watermarking embeds a hidden, recognizable input/output signature into the circuit design. That is, it uses an internal sequential function, such as a finite state machine, to generate a predictable output sequence when a known input sequence is applied. Thus, the input/output signature can be used to identify the silicon IP's ownership. However, a shortcoming of this watermarking technique is that unauthorized deletion of the watermark is still possible. However, when the silicon IP is integrated into an electronic system design, at the layout mask level, its input/output pins may become internal connection paths and be covered by other mask layers. Hence, it is hard to access the input/output pins and validate the silicon IP's input/output signature.

Furthermore, both "tagging" and "watermarking" techniques are passive methods to protect the silicon IPs' ownership. The "tagging" and "watermarking" techniques can be used to detect or collect evidence on any illegal use of a silicon IP in litigation, but they can not be used to hide the actual intellectual property (IP). The confidential foundry information, the key technology and essential design ideas of the silicon IP can still be easily lost through any illegal studying and analyzing of the silicon IP's layout database.

The cryptography based IP protection method introduced in "Methodology for protection and licensing of HDL IP" appearing in D&R industry articles (March 2006), can effectively use public encryption algorithm to protect software IPs. But it is not capable of operating on the layout database, so it can not be adopted as a valid method to protect silicon IPs. Another encryption related method uses an encrypting program to encrypt the whole silicon IP layout database. But after encryption, the output file is no longer in the original layout database format, and can not be commonly accepted by the electronic design automation (EDA) software tools and utilized as a circuit design block in a SOC design. Thus, such an encryption method is not an applicable solution.

There is a need for a more effective technique for protecting the silicon IP from unauthorized copying, re-use, transfer or sale. There is further a need for such a silicon IP protection technique that is cost-effective yet relatively simple to implement, and resistant to tampering by the user.

Given the anticipated growth in commerce related to silicon IP, the electronic circuit design industry is in dire need of a method of protecting their silicon IP that is more effective and affordable than existing schemes.

SUMMARY OF THE INVENTION

In accordance with the present invention, a method and system are provided for protecting silicon IP from unauthorized use, transfer and sale, and for hiding confidential technology information contained in silicon IP.

In accordance with the present invention, more particularly, a method and system are provided for creating a content-encrypted silicon IP layout database from its original layout database. The layout database may be a GDSII file, an OASIS file, etc., in which multiple records sequentially build the layout database.

In an aspect of the present invention, the method first parses the original layout database which is then saved as sequential records in memory. Next, the structure records, which construct structures in the original layout database, are selected from the saved records. Once the structure records have been selected, the data of the structure records may be compressed using a public compressing method, and may be encrypted with using a public cryptography algorithm. Each byte of the data, after compression and encryption, is mapped to one or two printable ASCII (American Standard Code for Information Interchange) characters. Finally, all the printable ASCII characters are used to build new text element records in a new structure. By replacing the selected structure records with the newly created structure records in the original layout database, the content-encrypted silicon IP layout database can be created.

Besides the original layout database, other related circuit design files, (such as functional description HDL files or simulation netlist files etc.), can also be converted to text element records in new structures and be integrated in the same content-encrypted silicon IP layout database to build up a more complete silicon IP delivery package.

The content-encrypted silicon IP layout database can be accepted by current EDA software tools directly and utilized as a black-box or gray-box circuit block in a SOC design. When the SOC design is taped out to a foundry for chip manufacture, all such black-box or gray-box circuit blocks need to be decrypted to restore their real or original circuit layout. The decryption process flow should reverse the encrypting process flow.

Aspects of the invention may be implemented as a computer process, a computing system, or as an article of manufacture such as a computer program product or computer-readable medium for protecting the silicon IP. The computer program product may be a computer storage media readable by a computer and encoding a computer program of instructions for executing a computer process for protecting the silicon IP. The computer program product may also be a propagated signal on a carrier readable by a computing system. Alternately, the computer program product may encode a computer program of instructions for executing a computer process for protecting the silicon IP.

Another aspect of the present invention includes a computer program product including a computer-readable medium having instructions for causing a computer to: parse a layout database representative of a silicon intellectual property (IP) to form a set of records. The instructions also cause the computer to encrypt data content of portions of said set of records into printable ASCII characters. The instructions cause the computer to write said set of records to a new layout database; and when writing, substitute said portions of said set of records with said printable ASCII characters to form an encrypted silicon IP layout database.

A further aspect of the present invention includes a computerized system comprising a layout database parser operative to parse a layout database representative of a silicon intellectual property (IP) to form a set of records. The system also includes an encryption operator operative to encrypt data content of portions of said set of records into printable ASCII characters. A layout database writer is provided and operative to write said set of records to a new layout database and substitute said portions of said set of records in the new layout database with said printable ASCII characters to form an encrypted silicon IP layout database.

A still further aspect of the present invention includes a method comprising: creating by at least one silicon intellectual property (IP) provider an original silicon IP layout database, and an interface-ready content-encrypted silicon IP layout database using a cryptographic key associated with the provider. The method includes acquiring by an electronic company the interface-ready content-encrypted silicon IP layout database from the at least one provider; incorporating the interface-ready content-encrypted silicon IP layout database of at least one provider into a circuit design. The method also includes delivering the circuit design to a foundry for fabrication and before fabrication, finding by the foundry the interface-ready content-encrypted silicon IP layout database for the at least one provider and restoring the original silicon IPs layout database using a decryption key associated with the cryptographic key for the at least one provider.

These and various other features as well as advantages, which characterize the present invention, will be apparent from a reading of the following detailed description and a review of the associated drawings.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION OF THE PREFERRED EMBODIMENTS

In one or more embodiments as described herein, a method and system for deterring the unauthorized use and sale of silicon IPs is provided, wherein a content-encrypted silicon IP layout database is created from its original layout database.

Traditionally, the electronic industry uses layout database, such as a GDSII file, an OASIS file, etc. to deliver and transfer silicon IP product. A GDSII, OASIS, and other format layout database is a sequential list of variable length records, each record contains a header to tell what information is in the record. All records are organized in a hierarchy of structures, each structure containing elements, such as boundary polygon, path, text, box, structure references, structure array references, and the elements are situated on layers. By extracting two dimension graphical design data from records contained in a GDSII, OASIS, or other format layout database, a fabrication factory can generate photography masks and manufacture integrated circuit chips accordingly.

In the current GDSII, OASIS and other format layout database, circuit design information and foundry technology information are exposed without any protection. In one or more embodiments, the present invention provides a method and system to hide and safeguard the information, and at the same time, the encrypted output file is still in the original layout database format for keeping the usability intactness of a silicon IP.

In the following detailed description, references are made to the accompanying drawings that form a part hereof, and in which are shown by way of illustration specific embodiments or examples.

Figure 1:
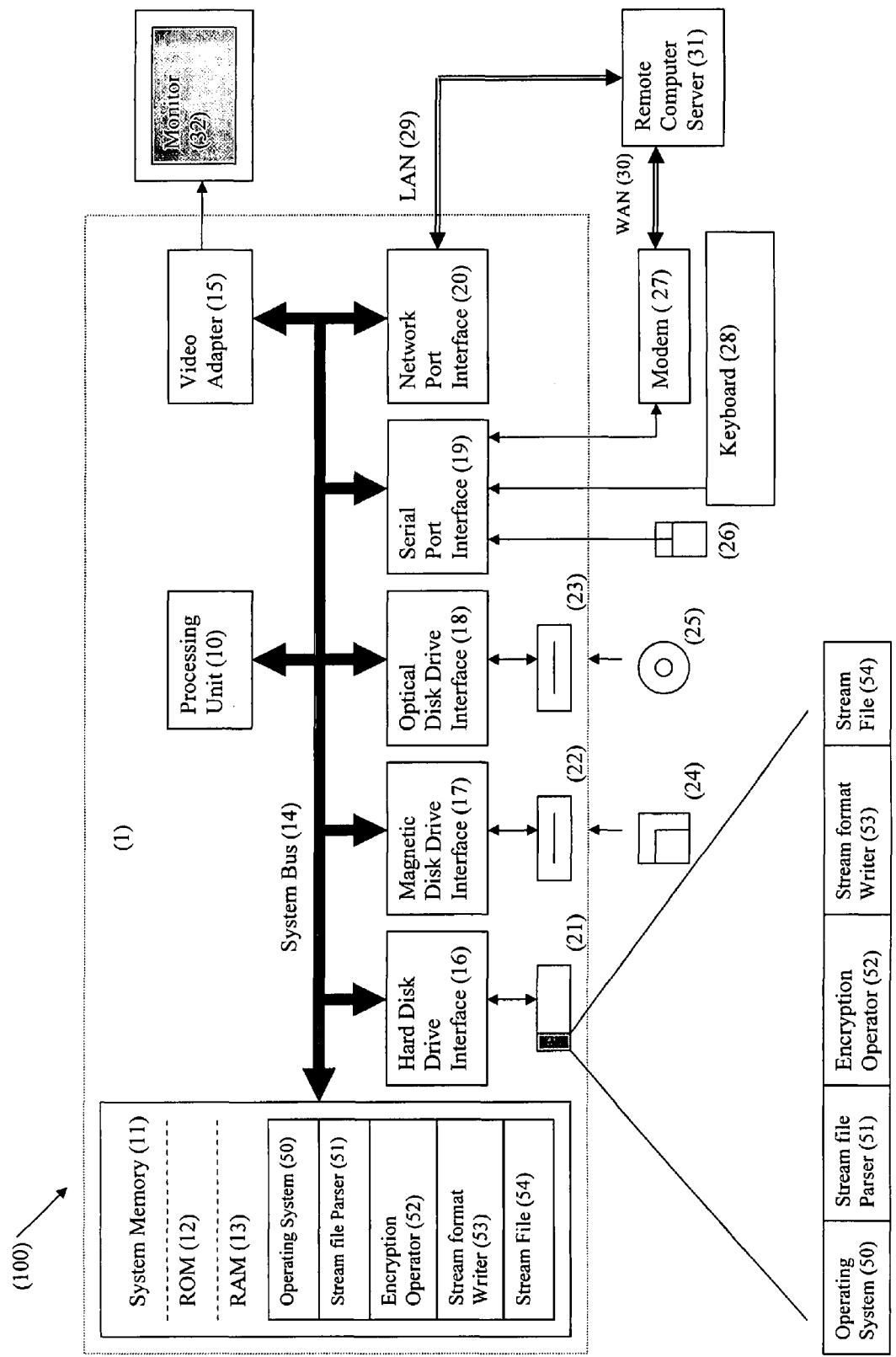
FIG. 1 is a block diagram of a computer system that provides the illustrative operating environment for the present invention.

Referring now to FIG. 1, an illustrative computer system or network 100 for implementing an illustrative embodiment of the present invention is shown. Within the illustrative operating environment, the present invention may operate to generate a content-encrypted silicon IP layout database. However, those skilled in the art should appreciate that the invention may be practiced in any type of computer operating environment such as multiprocessor systems, microprocessor-based or programmable consumer electronics, minicomputers, mainframe computers, and the like. The invention may also be practiced in distributed computing environments where tasks are performed by remote processing devices.

The computer system or network 100 for implementing the invention includes a conventional computer 1, including a processing unit 10, a system memory 11, and a system bus 14 that connects the system memory 11 to the processing unit 10. The system memory 11 includes read only memory (ROM) 12 and random access memory (RAM) 13. The computer system 1 further includes a hard disk drive 21, a magnetic disk drive 22, e.g., to read from or write to a removable disk 24, and an optical disk drive 23, e.g., for reading a CD-ROM disk 25 or to read from or write to other optical media. The hard disk drive 21, magnetic disk drive 22, and optical disk drive 23 are connected to the system bus 14 by a hard disk drive interface 16, a magnetic disk drive interface 17, and an optical drive interface 18, respectively. The drives and their associated computer-readable media provide nonvolatile storage for the computer 1. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. Computer-readable media can comprise RAM, ROM, EEPROM, CD-ROM or other optical disk storage, magnetic disk storage or other magnetic storage devices, or any other medium that can be used to carry or store program code in the form of instructions or data structures and which can be accessed by a computer. Software or program code may be transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The computer 1 contains an operating system 50 and stored functional blocks' codes including, in one embodiment, a layout database parser 51, an encryption operator 52 and a layout database writer 53. The layout database parser 51 provides functions for parsing a layout database and extracting records. The encryption operator 52 provides functions for encrypting the data of selected structure records. The layout database writer 53 provides functions for creating new text element records in a new structure with the encrypted data, and using the new structure records to replace the processed structure records. The IP-Encrypt module 60 includes the layout database parser 51, the encryption operator 52 and the layout database writer 53 which, in one embodiment, implements the functionalities provided by the current invention. In general, the IP-Encrypt module 60 is software based and hereinafter referred to as "IP-Encrypt tool".

A user may enter commands and information into the computer I through a keyboard 28 and pointing device, such as a mouse 26. Other input devices (not shown) may include a microphone, game pad, scanner, or the like. These and other input devices are often connected to the processing unit 10 through a serial port interface 19 that is coupled to the system bus 14, but may be connected by other interfaces, such as a universal serial bus (USB). A monitor 32 or other type of display device is also connected to the system bus 14 via an interface, such as a video adapter 15. In addition to the monitor, computers typically include other peripheral output devices (not shown), such as, without limitation, speakers or printers.

The computer 1 may operate in a networked environment using logical connections to one or more remote computers, such as a remote computer 31. The remote computer 31 may be a server, a router, a peer device or other common network node, and typically includes many or all of the elements described relative to the computer 1. The logical connections depicted in FIG. 1 include a local area network (LAN) 29, denoted as a double dotted line, and a wide area network (WAN) 30, denoted as a double dotted line. Such networking environments are commonplace in offices, enterprise-wide computer networks, intranets and the Internet.

When the computer 1 is used in a LAN networking environment, the computer 1 is connected to the LAN 29 through a network port interface 20. When the computer 1 is used in a WAN networking environment, the computer system 1 may include a modem 27 or other means for establishing communications over the WAN 30, such as the Internet. The modem 27, which may be internal or external, is connected to the system bus 14 via the serial port interface 19. In a networked environment, program codes depicted relative to the computer 1, or portions thereof, may be stored in the remote computer 31. It will be appreciated that the network connections shown are illustrative and other means (wired or wireless) of establishing a communications link between the computers may be used. It will be further be appreciated that the invention could equivalently be implemented on a client server network architecture other than a local computer system, and could equivalently be transmitted to the local computer system by means other than a CD-ROM, for example, by way of the network port interface 20.

Figure 2:
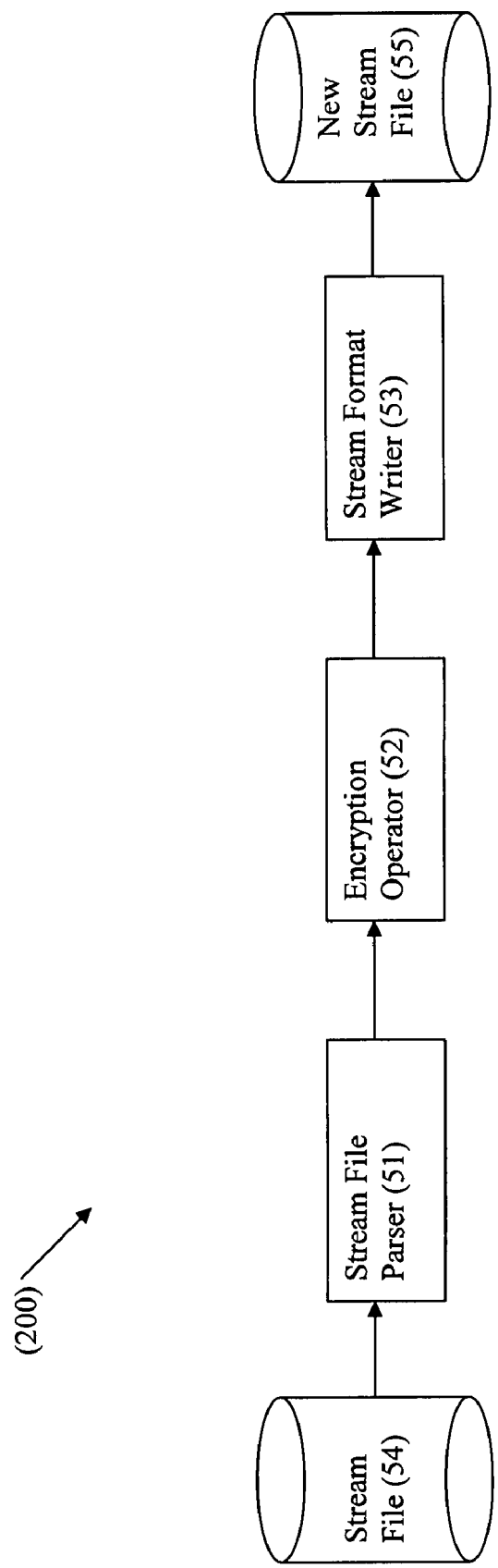
FIG. 2 is a block diagram, which shows an illustrative architecture for creating a content-encrypted silicon IP layout database from its original layout database according to one embodiment of the present invention.

FIG. 2 is a block diagram 200 showing an illustrative architecture for generating content-encrypted silicon IP layout database 55 from its original layout database 54 according to one embodiment of the present invention. The layout database 54 is the original silicon IP layout database, which may be a GDSII file, OASIS file or other format layout database file, and is the source input file to be processed and encrypted. The layout database parser 51 parses the layout database 54 to discover and save all records. The saved records then are passed to the encryption operator 52. The encryption operator 52 first selects structure records, then encrypts the data contained in the selected structure records into printable ASCII characters and passes the ASCII characters to the layout database writer 53. The layout database writer 53 uses the ASCII characters to create new text element records in a new structure, and generates the content-encrypted silicon IP layout database 55 by replacing the processed structure records with the new structure records in the layout database 54.

It will be appreciated that the functionalities of the layout database parser 51, the encryption operator 52 and the layout database writer 53 may be implemented by user defined functions in C/C++ programming language. As known to those skilled in the art, other methods for implementing the functionalities may also be utilized without departing from the scope of the present invention, for example the functionalities may be implemented by user defined classes in any object oriented programming language or by any user defined script functions. The implementation of the functionalities of the layout database parser 51, the encryption operator 52 and the layout database writer 53 are shown in FIGS. 3, and 5-8 and will be described in greater detail below.

Figure 3:
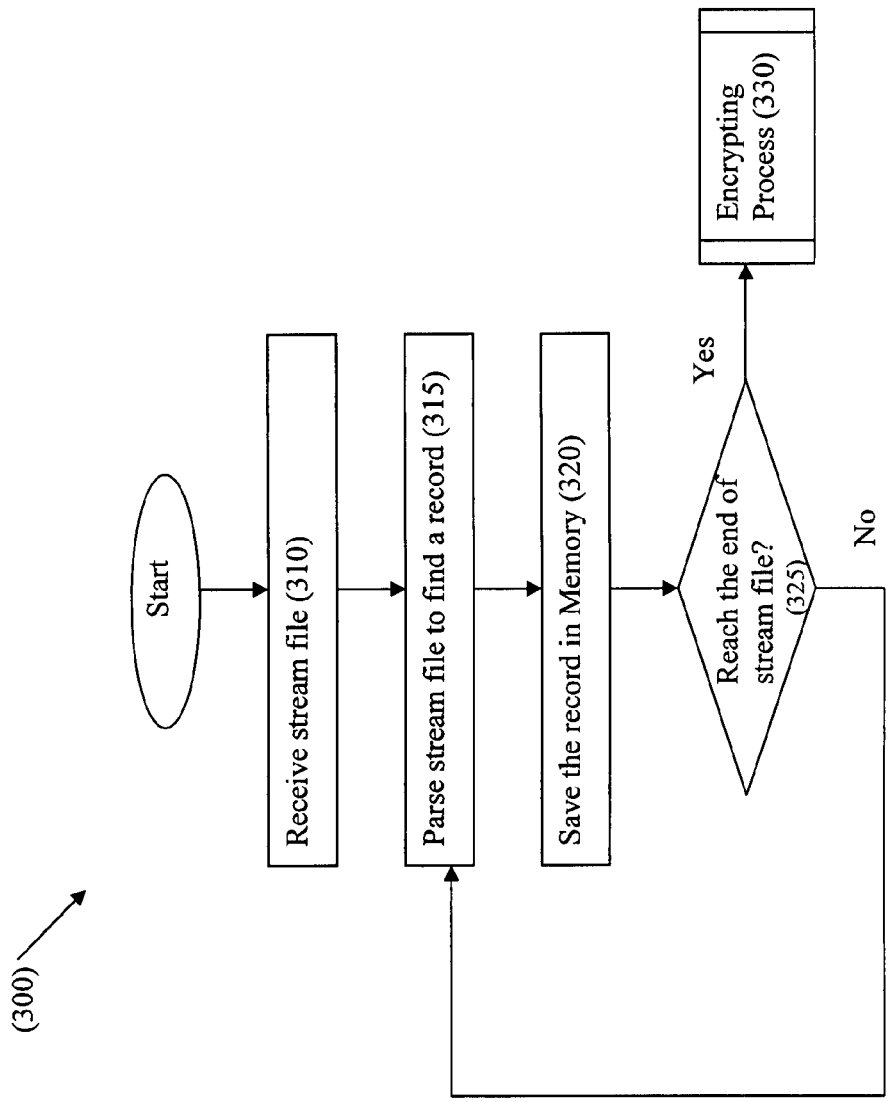
FIG. 3 is a process flow diagram illustrating steps involved in layout database parsing process according to one embodiment of the present invention.

FIG. 3 is a process flow diagram illustrating steps involved in a layout database parsing process 300 according to one preferred embodiment of the present invention. The layout database parsing process 300 depicted in FIG. 3 generally corresponds to the layout database parser 51 illustrated in FIG. 2. However, as those skilled in the art recognize, the layout database parser 51 shown in FIG. 2 may be implemented in other ways as well.

At the first step 310 of the layout database parsing process 300 set forth in FIG. 3, the layout database 54 is received and opened, and then parsed to discover a record at step 315. By way of example, for extracting each record, the first two eight-bit bytes are read from the layout database 54 to get the record's length (hereinafter referred to as "LengthOfRecord"). Then the third byte is read in to get the record type. Thereafter, the forth byte is read in to get the type of data contained in the record. Finally the following the LengthOfRecord—4 bytes are read in to get the record's data. As known to those skilled in the art, the bytes described above are the standard record structure employed for a GDSII, OASIS or other format layout database.

At step 320, a sufficient amount of memory space, (not less than LengthOfRecord bytes), is allocated in the system memory 11 shown in FIG. 1 to save the extracted record from step 315.

If at step 325, the record type of the saved record from step 320 is an ENDLIB 495 (FIG. 4) type record, which marks the end of the layout database 54, then the process flow 300 continues to step 330 where the encryption operator 52 starts to apply encrypting operations on the structure records within the saved records. If at step 325, the record type of the saved record from step 320 is not an ENDLIB 495 type record, then the process flow 300 continues or loops to step 315 where the layout database 54 is again parsed to extract the next record. This loop continues until the ENDLIB 495 type record is reached.

Figure 10:
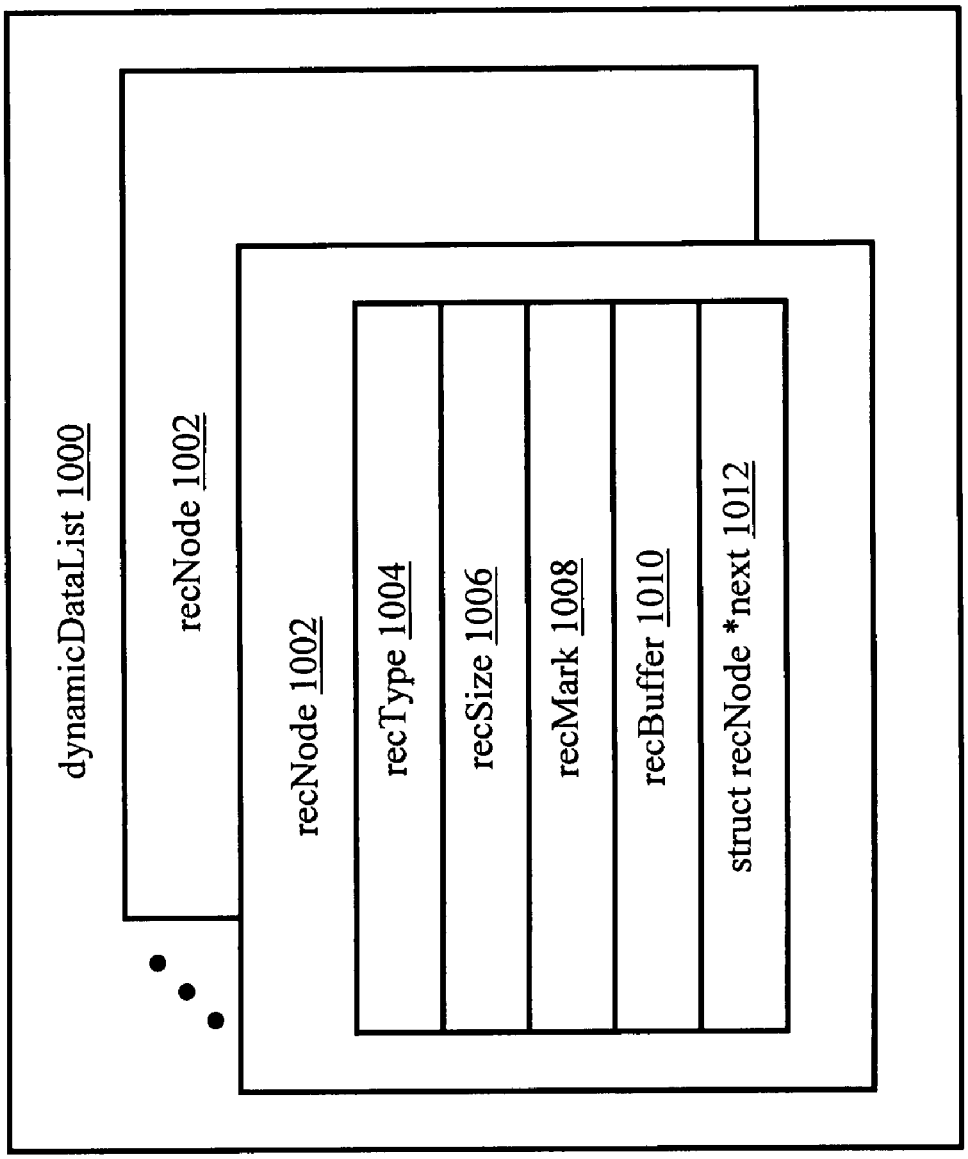
FIG. 10 is a diagram illustrating the dynamic data list fields created by one implementation of the present invention.

All the extracted records should be saved sequentially by following exactly the same order as originally saved in the layout database 54. In accordance with one preferred embodiment, a self-referential data type in C/C++ programming language is defined for constructing a dynamic data list, (hereinafter referred as "dynamicDataList") 1000 (FIG. 10), to save all the extracted records. An exemplary program code for construction the dynamicDataList 1000 includes the following:

```
struct recNode {
    int     recType;
    int     recSize;
    int     recMark;
    char *  recBuffer;
    struct recNode *next;
};
``` wherein, in the data type recNode 1002, five fields are defined, in which recType 1004 is used to save the record type, recSize 1006 is used to save the length of the record, recMark 1008 is used later by the encryption operator 52 and the layout database writer 53 to identify whether the record has been selected for encrypting or not, recBuffer 1010 is used to save the complete data content of the record and the last field "next" (struct recNode *next) 1012 is used to point to the next extracted record data space.

It will be appreciated that the present invention is not limited to the data structure type recNode 1002 defined above to save the extracted records, other data types, such as files, arrays, hash tables, trees, vectors or classes, etc., may also be used to keep the contents of the extracted records without departing from the scope of the present invention.

Figure 4:
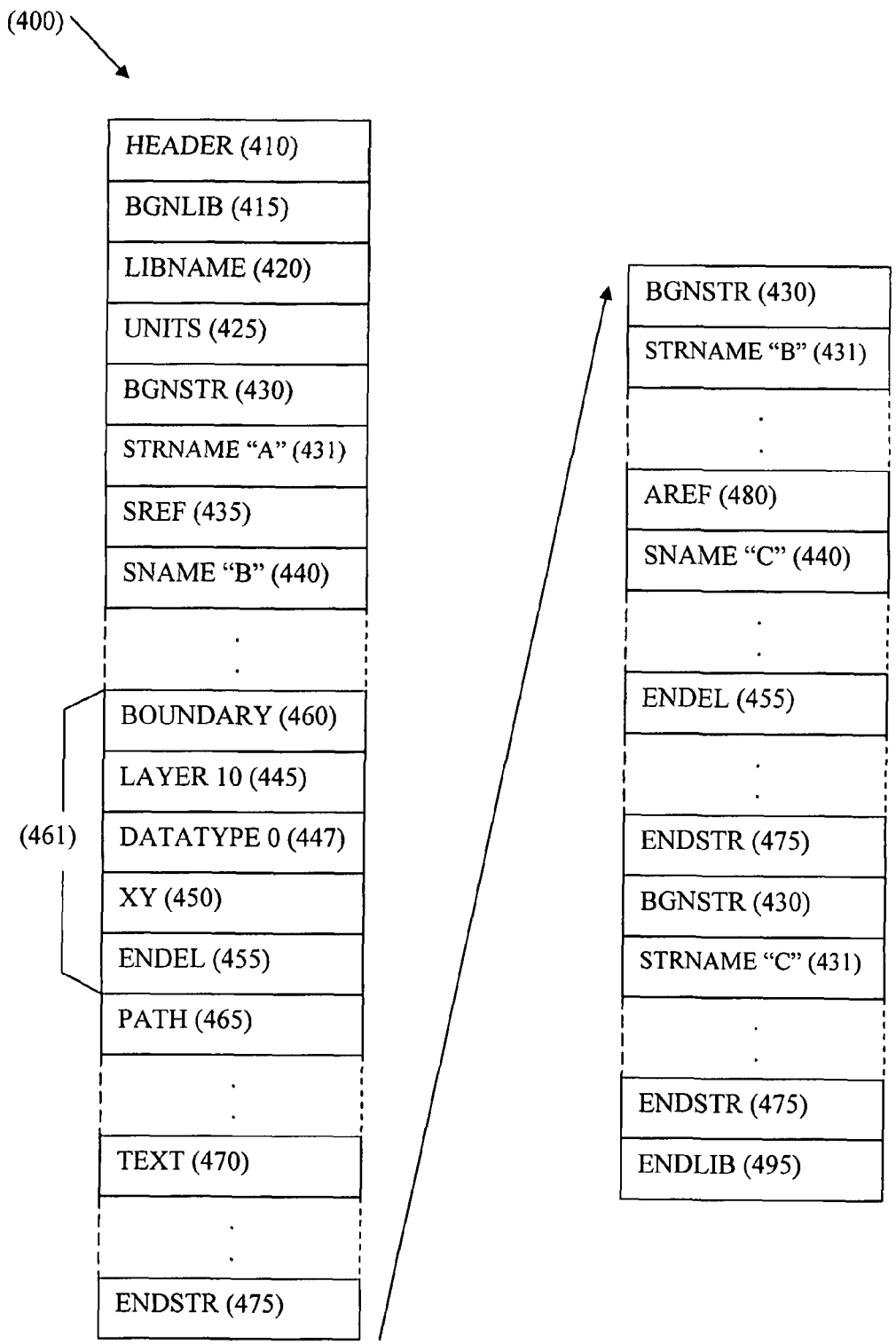
FIG. 4 is a diagram, which illustrates an example of a layout database saved as multiple records sequentially in the system memory.

A memory segment diagram 400 in FIG. 4 illustrates an example of a layout database saved as multiple records sequentially in system memory 11 by the layout database parsing process 300. The first record in the memory segment 400 is a HEADER 410 type record. After the HEADER 410 type record, there generally are a BGNLIB 415 type record, a LIBNAME 420 type record, a UNITS 425 type record, and multiple structures. The last record is a ENDLIB 495 type record. For each structure, it begins with a BGNSTR 430 type record and a STRNAME 431 type record, and ends with a ENDSTR 475 type record, and in between, there are multiple elements. Generally the elements may be boundary elements, path elements, text elements, box elements, structure reference elements, and structure array reference elements. Each element begins with its keyword record, such as a SREF 435 type record, a AREF 480 type record, a SNAME 440 type record, a BOUNDARY 460 type record, a PATH 465 type record, a TEXT 470 type record, etc., and ends with a ENDEL 455 type record. A boundary element 461, for example as shown in FIG. 4, contains a BOUNDARY 460 type record, a LAYER 445 type record, a DATATYPE 447 type record, a XY 450 type record and a ENDEL 455 type record. And a text element 471 contains a TEXT 470 type record, a LAYER 445 type record, a TEXTTYPE 448 type record, a PRESENTATION 479 type record, a STRANS 476 type record, a MAG 477 type record, a XY 450 type record, a STRING 478 type record and a ENDEL 455 type record.

As known to those skilled in the art, all the upper case words used in FIG. 4, such as "HEADER", "BGNLIB", "LIBNAME", etc. are predefined record types in GDSII, OASIS, or other layout database format. And the words "structure" and "element" used above are common phrases to describe GDSII, OASIS, or other layout database format.

Figure 5:
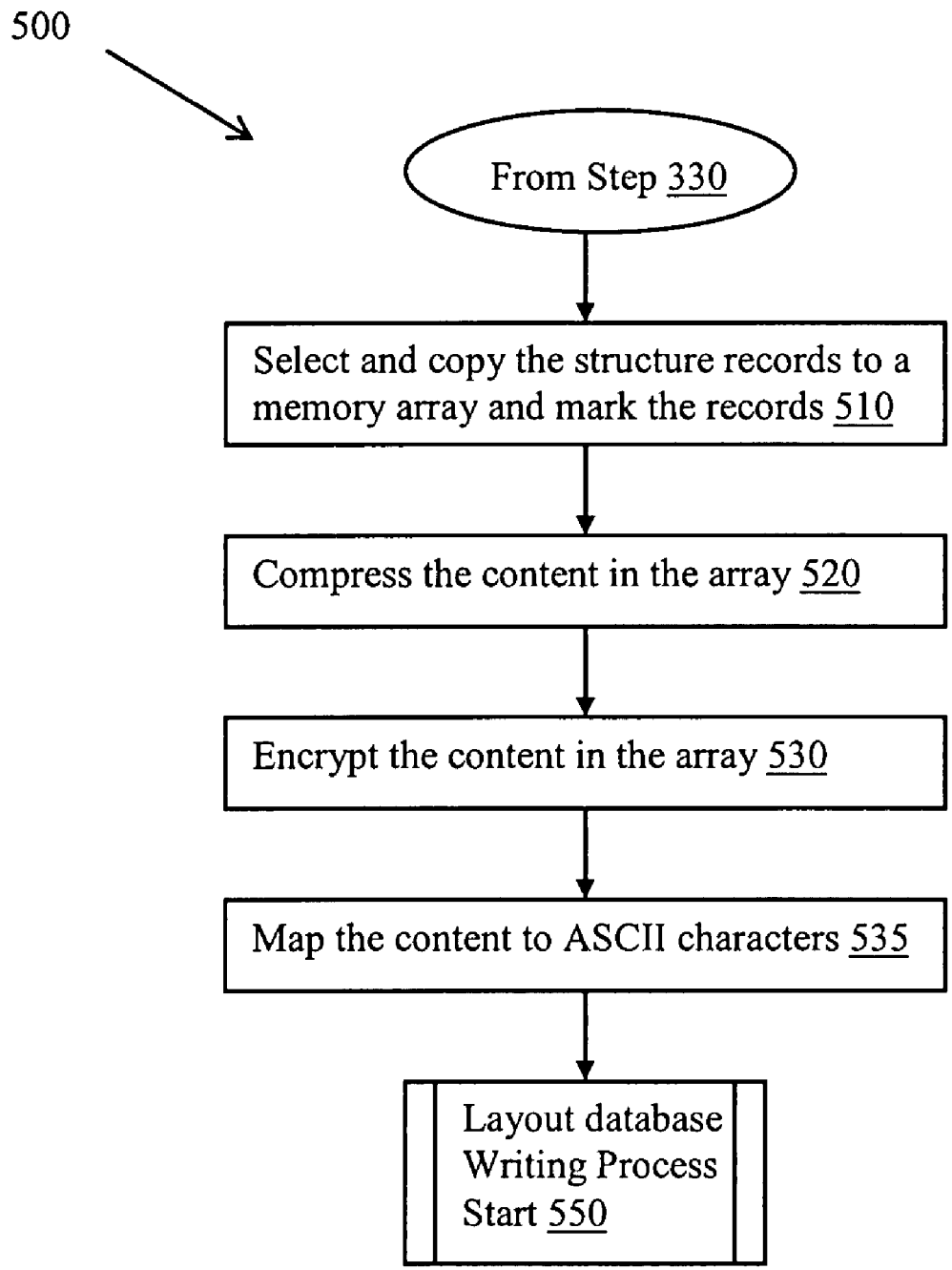
FIG. 5 is a process flow diagram illustrating steps involved in data encrypting process according to one embodiment of the present invention.

FIG. 5 is a process flow diagram illustrating steps involved in an encrypting process 500 according to one preferred embodiment of the present invention. The encrypting process 500 depicted in FIG. 5 generally corresponds to the encryption operator 52 illustrated in FIG. 2. However, as those skilled in the art recognize, the encryption operator 52 shown in FIG. 2 may be implemented in other ways as well.

Figure 11:
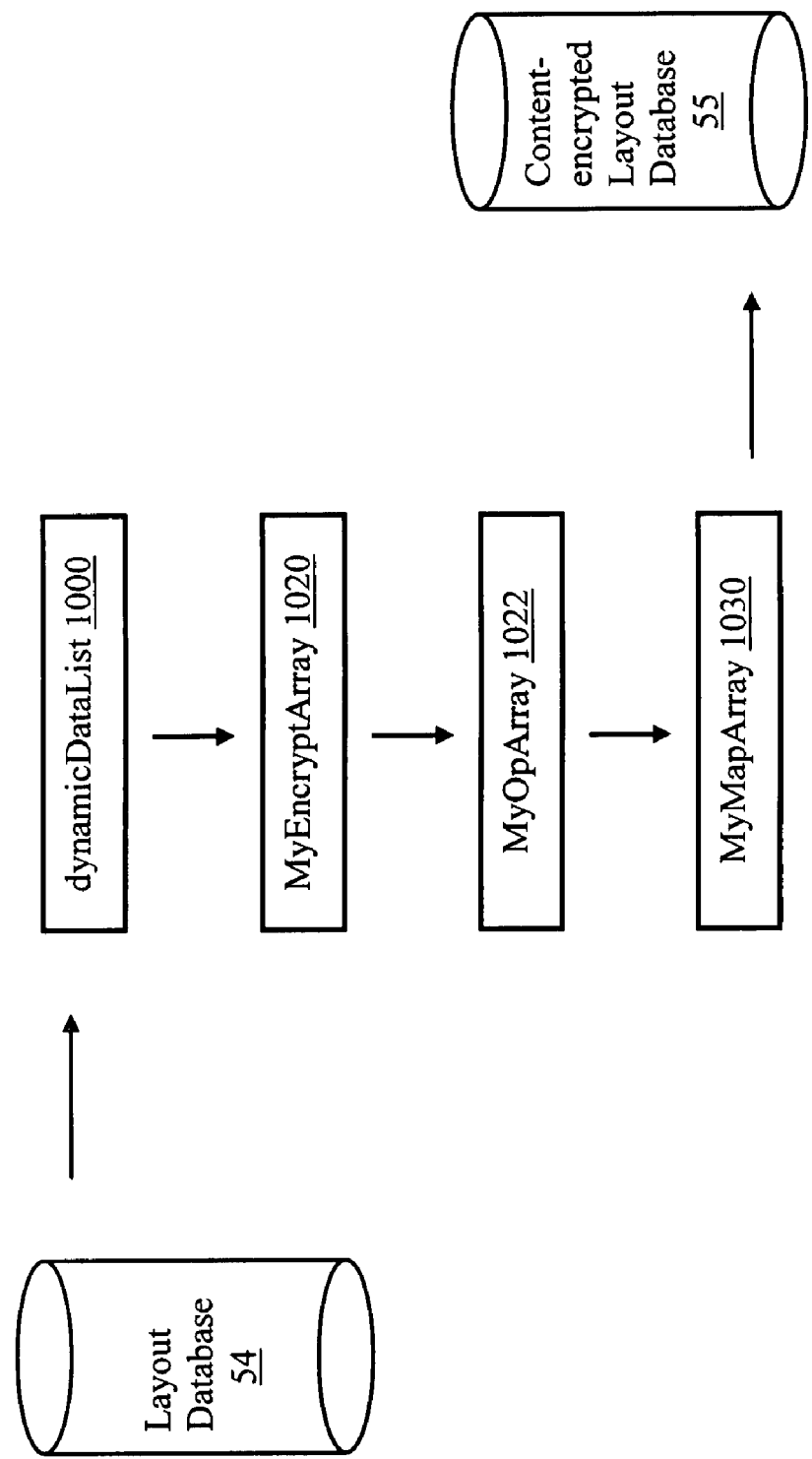
FIG. 11 is a diagram of a set of memory arrays MyEncryptArray, MyOpArray and MyMapArray created by one implementation of the present invention.

The process flow 500 begins at step 510 where the structure records (the records in structures of the layout database 54), among the whole records collected by the process flow 300 illustrated in FIG. 3 are selected and marked, and their data contents are copied to a new memory array (hereinafter referred as "MyEncryptArray") 1020 (FIG. 11). To implement the functionality of step 510, in accordance with one preferred embodiment of the present invention, for each record saved in the dynamicDataList 1000 discussed above, its record type is checked by comparing the value kept in field recType 1004. The records, from the record whose type is BGNSTR 430 type record to the record whose type is ENDSTR 475 type record, are selected and marked by respectively setting the field recMark 1008 of each record to the status SELECTED. The value saved in the field recSize 1006 of each selected records is added up to get the size in bytes of the MyEncryptArray 1020. After the memory space for MyEncryptArray 1020 is allocated in the system memory 11 shown in FIG. 1, the data content saved in the field recBuffer 1010 of each selected records is copied sequentially to MyEncryptArray 1020.

It will be appreciated that the present invention is not limited to the full scale selection of all the structure records discussed above and that partial selection of the structure records, (that is only the records of several elements in structures are selected and copied,) may also be implemented without departing from the scope of the present invention. For example and referring back to the memory segment diagram 400 in FIG. 4, besides all the records between BGNSTR 430 type record and ENDSTR 475 type record are selected for encryption to achieve a complete Silicon IP layout content protection, only the records in the boundary element 461 may be selected for encryption, so only the layout polygon in the boundary element 461 is hidden and protected. It will be further appreciated that, as those skilled in the art recognize, the process flow 500 may also be applied multiple times to process partial records selection in different structures of the layout database 54 without departing from the scope of the present invention.

At step 520, the structure records data collected at step 510 are compressed mainly for reducing the size of the final content-encrypted layout database 55, and also for encoding the data to protect the layout content. In one embodiment of the present invention, the compressing functionality of step 520 is invoked by a compress( ) function from a conventional compression library. For example, the exemplary embodiment employs the compress( ) function in ZLIB 1.1.4 library written by Jean-loup Gailly and Mark Adler. The 'ZLIB' compression library is designed to be an open source, general-purpose, legally unencumbered and lossless data-compression library for use on virtually any computer hardware and operating system. The 'ZLIB' data format is itself portable across a multitude of platforms.

For using the compress( ) function in ZLIB 1.1.4 library, besides the MyEncryptArray 1020 created at step 510, a new character memory array (afterwards referred as "MyOpArray") 1022 (FIG. 11) is allocated in the system memory 11 shown in FIG. 1. The size of the MyOpArray 1022 is 0.1% larger than the size of the MyEncryptArray 1020 plus 12 bytes. The function call of compress( ) in ZLIB 1.1.4 library includes the following:

compress(MyOpArray, & newLength, MyEncryptArray, oldLength).

where both newLength and oldLength are integer type variables in C/C++ programming language. The variable oldLength is used to save the size of the MyEncryptArray 1020 and the variable newLength is used to save the actual content size of the MyOpArray 1022. The MyOpArray 1022 keeps the data result after data in the MyEncryptArray 1020 is compressed.

It will be appreciated that the above-described implementation for step 520 is but one illustrative implementation and other methods for implementing the functionality of step 520 known to those skilled in the art, such as similar or derived functions from bzip2, gzip, unix compress, etc., may also be utilized without departing from the scope of the present invention.

At step 530, the compressed data from step 520 is encrypted for strongly safeguarding the layout content of a silicon IP. In one embodiment of the present invention, the encrypting functionality of step 530 is implemented with the Advanced Encryption Standard (AES) algorithm. The Advanced Encryption Standard (AES) algorithm, also known as Rijndael algorithm, specifies a FIPS-approved cryptographic algorithm that can be used to protect electronic data where FIPS stands for "Federal Information Processing Standard". The AES algorithm is a symmetric block cipher that can encrypt and decrypt information.

Figure 12:
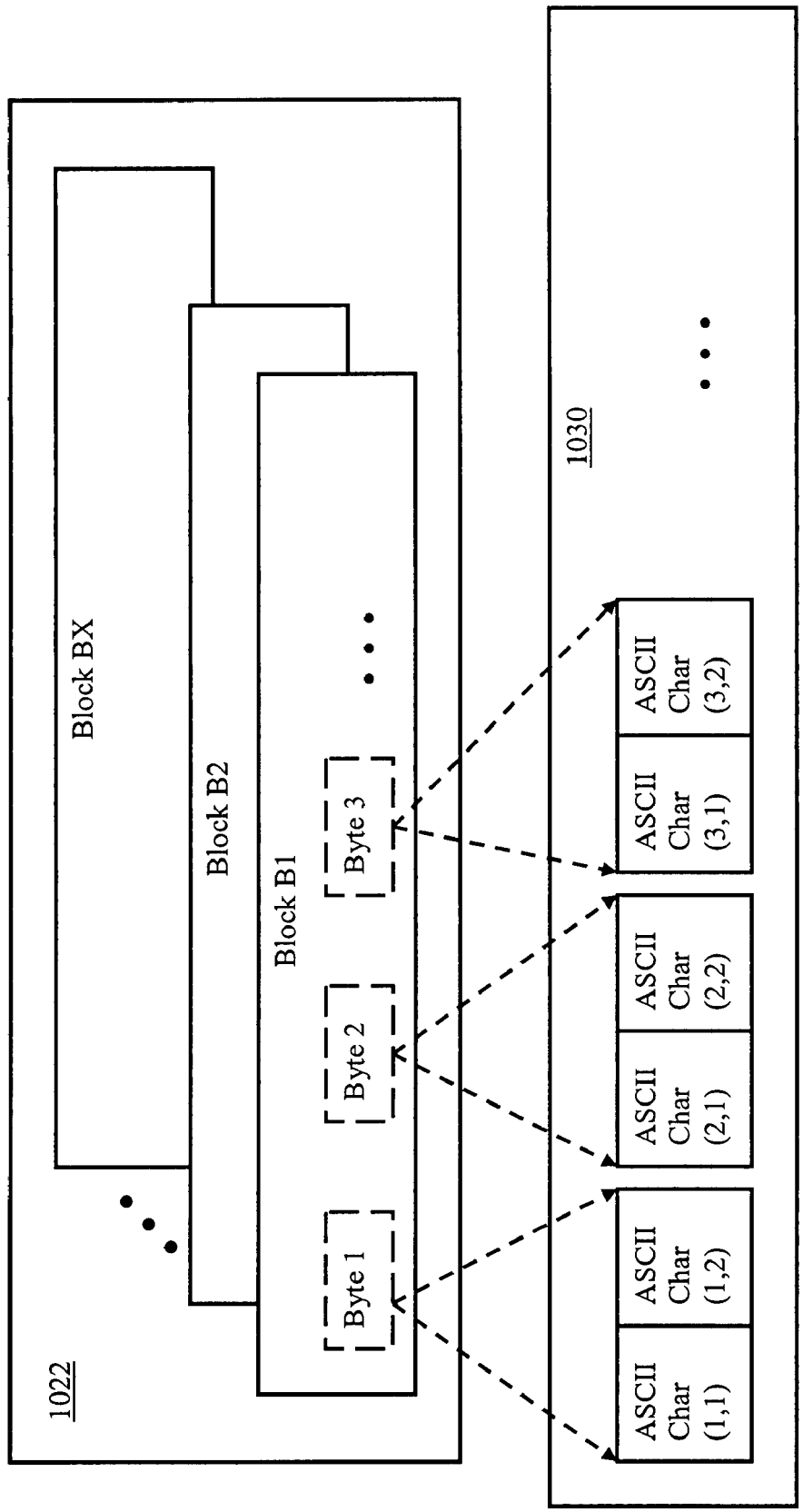
FIG. 12 is a diagram of the data blocks created in the MyOpArray according to one implementation of the present invention.

To utilize the AES algorithm's encryption functions, first a cryptographic key is received from the keyboard 28 in FIG. 1 or from but not limited to other means, as known to those skilled in the art, such as from the mouse 26 shown in FIG. 1, or from the LAN 29 shown in FIG. 1 or from a random key generator function, etc. Then data contained in the MyOpArray 1022 from step 520 is sequentially divided to multiple 16 bytes blocks B1, B2, . . . BX, (FIG. 12), each block is encrypted by the AES encryption function and then is saved back to the MyOpArray 1022. As known to those skilled in the art, for the last data block BX, if it contains less than 16 bytes, 0 value byte or other value byte can be used to fill the 16 bytes block spare part for the AES encryption.

It will be appreciated that the above-described implementation for step 530 is but one illustrative implementation and other methods for implementing the encryption functionality of step 530 known to those skilled in the art, such as RSA, DES, triple DES, MARS, Twofish, Serpent, Skipjack, and Blowfish etc., may also be utilized without departing from the scope of the present invention.

At step 535, each byte of the encrypted data from step 530 is mapped to one or two printable ASCII characters. By way of example, the byte 1 is mapped to ASCII character 1,1 and 1,2. The byte 2 is mapped to ASCII character 2,1 and 2,2. The byte 3 is mapped to ASCII character 3,1 and 3,2 so on and so forth. To implement the functionality of step 535, in accordance with one embodiment of the present invention, first a new character type memory array (later referred as MyMapArray) 1030 (FIG. 11) is allocated in the system memory 11 shown in FIG. 1, the size in bytes of the MyMapArray 1030 is the double of the size of the MyOpArray 1022 from step 530. For each byte in the MyOpArray 1022, the binary values of its higher 4 bits and its lower 4 bits are calculated, as known to those skilled in the art, a byte normally has 8 binary bits. Then for each of the calculated values, it is added up by 0x30 and saved into the MyMapArray 1030 if it is less than 10, or it is added up by 0x41 and saved into the MyMapArray 1030 if it is equal or greater than 10. After all the bytes in the MyOpArray 1022 are processed and saved into the MyMapArray 1030, then the process flow 500 continues to step 550 where the layout database writer 53 starts to output the content of the MyMapArray 1030 to the content-encrypted layout database 55.

It will be appreciated that the present invention is not limited to the mapping method discussed above and additional methods for mapping binary bytes to printable ASCII characters, known to those skilled in the art, may also be applied without departing from the scope of the present invention.

Figure 6:
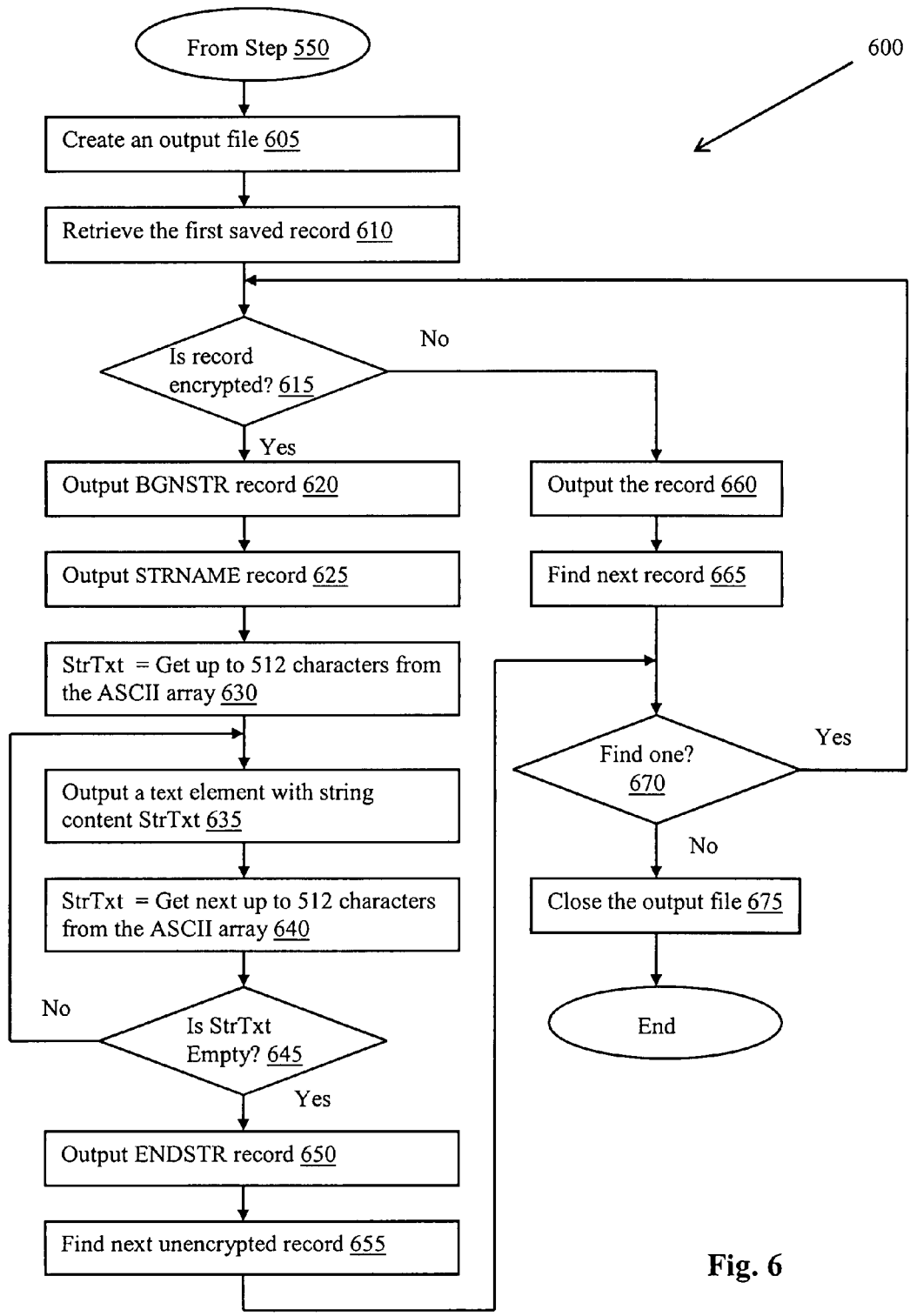
FIG. 6 is a process flow diagram illustrating steps involved in layout database writing process according to one embodiment of the present invention.

FIG. 6 is a process flow diagram illustrating steps involved in a layout database writing process 600 according to one preferred embodiment of the present invention. The layout database writing process 600 depicted in FIG. 6 generally corresponds to the layout database writer 53 illustrated in FIG. 2. However, as those skilled in the art recognize, the layout database writer 53 shown in FIG. 2 may be implemented in other ways as well.

The process flow 600 begins at step 605 where the content-encrypted layout database 55 shown in FIG. 2 is opened for saving the record data generated by the following steps in the process flow 600.

At step 610, the first record collected by the process flow 300 illustrated in FIG. 3 is retrieved, and in accordance with one preferred embodiment of the present invention, the first data record saved in the dynamicDataList 1000 as discussed above is found.

If at step 615, the found record is determined to be selected for encryption by the encrypting flow 500 illustrated in FIG. 5, and that is, in accordance with one preferred embodiment of the present invention, the field recMark 1008 of the found data record is set with SELECTED status as discussed above, the process flow then continues to step 620. If at step 615, the found record is determined to be spared from encryption by the encrypting flow 500, and that is, in accordance with one preferred embodiment of the present invention, the field recMark 1008 of the found data record is not set with SELECTED status as discussed above, the process flow then continues to step 660.

At step 620, the BGNSTR 430 type record, which has a fixed data content and marks the start of a structure, is written out to the content-encrypted layout database 55.

At step 625, the STRNAME 431 type record is written out to the content-encrypted layout database 55 with a structure name string, which is received from the keyboard 28 in FIG. 1 or from but not limited to other means, as known to those skilled in the art, such as from the mouse 26 shown in FIG. 1, or from the LAN 29 shown in FIG. 1 or from a layout database top cell name extracting function, etc.

At step 630, the starting and up to 512 characters from the ASCII character array created by the process flow 500 illustrated in FIG. 5 are copied to a new character type memory array (hereinafter sometimes referred to as "StrTxt"). To implement the functionality of step 630 and according to one preferred embodiment of the present invention, the memory space of StrTxt, (at least 512 bytes), is allocated in the system memory 11 shown in FIG. 1, then the first and up to 512 characters in array MyMapArray 1030 discussed above are copied to StrTxt. Additionally, the x-y coordinate for outputting a new text element in following steps is set to (0, 0), however, known to those skilled in the art, other x-y coordinates may also be used to output the new text element without departing from the scope of the present invention.

At step 635, a text element with the string content passed from step 630 is written out to the content-encrypted layout database 55 in FIG. 2. To implement the functionality of step 635 and according to one preferred embodiment of the present invention, first the TEXT 470 type record is written to the content-encrypted layout database 55, then the LAYER 445 type record with value 63 and the TEXTTYPE 448 type record with value 64 are written to the content-encrypted layout database 55, then the PRESENTATION 479 type record with value 8, the STRANS 476 type record and the MAG 477 type record with value 0.001 are written to the content-encrypted layout database 55, the XY 450 type record with the preset x-y coordinate value and the STRING 478 type record with string content saved in StrTxt discussed above are written to the content-encrypted layout database 55, and finally the ENDEL 455 type record is written to the content-encrypted layout database 55. Additionally, the x-y coordinate is changed by increasing the Y axis value by 1 for outputting the next text element.

It will be appreciated that the present invention is not limited to the constructing method of the text element discussed above and other methods may also be used to construct the text element without departing from the scope of the present invention, such as removing the PRESENTATION 479 type record or the STRANS 476 type record, etc. It will be further appreciated that the text element may be written on different layers besides layer (63:64) (based on the value of the LAYER 445 type record and the TEXTTYPE 448 type record) after consulting with the integrate circuit (IC) foundries and that the magnification of the text element may be set with other small values besides 0.001 without departing from the scope of the present invention. It will be further appreciated that the x-y coordinates for new text elements may be set at other positions without departing from the scope of the present invention.

At step 640, the next and up to 512 characters from the ASCII character array created by the process flow 500 illustrated in FIG. 5 are copied to StrTxt. To implement the functionality of step 640 and according to one preferred embodiment of the present invention, the next and up to 512 characters in array MyMapArray 1030 discussed above are copied to StrTxt.

If at step 645, there are characters copied to StrTxt at step 640, then the process flow 600 continues to step 635. If at step 645, there is no character copied to StrTxt at step 640, then the process flow 600 continues to step 650.

At step 650, the ENDSTR 475 type stream record, which has a fixed data content and marks the end of a structure, is written out to the content-encrypted layout database 55.

At step 655, the next unencrypted record collected by the process flow 300 in FIG. 3 is retrieved, and in accordance with one preferred embodiment of the present invention, following the data link established by the field "next" 1012 in the dynamicDataList 1000, the first unencrypted data record, the field recMark 1008 of which is not set with SELECTED status, is found.

At step 660, the record is directly written to the content-encrypted layout database 55. To implement the functionality of step 660 and in accordance with one preferred embodiment of the present invention, the data content saved in field recBuffer 1010 of the data record found by step 610 or step 655 is written out to the content-encrypted layout database 55.

At step 665, the next record after the record written out at step 660 is retrieved, and in accordance with one preferred embodiment of the present invention, the next data record pointed by field "next" 1012 in the dynamicDataList 1000 is found.

If at step 670, there is a record found at step 665 or step 655, the process flow 600 continues to step 615. If at step 670, there is no record found at step 665 or step 655, the process flow 600 closes the content-encrypted layout database 55 at step 675 and ends.

The process flow 600 is implemented to output the content-encrypted layout database 55 in FIG. 2 with the encrypted and mapped data of all the structure records. However, known to those skilled to the art and referring back to the discussion at step 510 in the process flow 500, it will be appreciated that the encrypted and mapped data of partial structure records, may also be written to the content-encrypted layout database 55 shown in FIG. 2 by skipping step 620, step 625 and step 650 of the process flow 600 without departing from the scope of the present invention.

Figure 7:
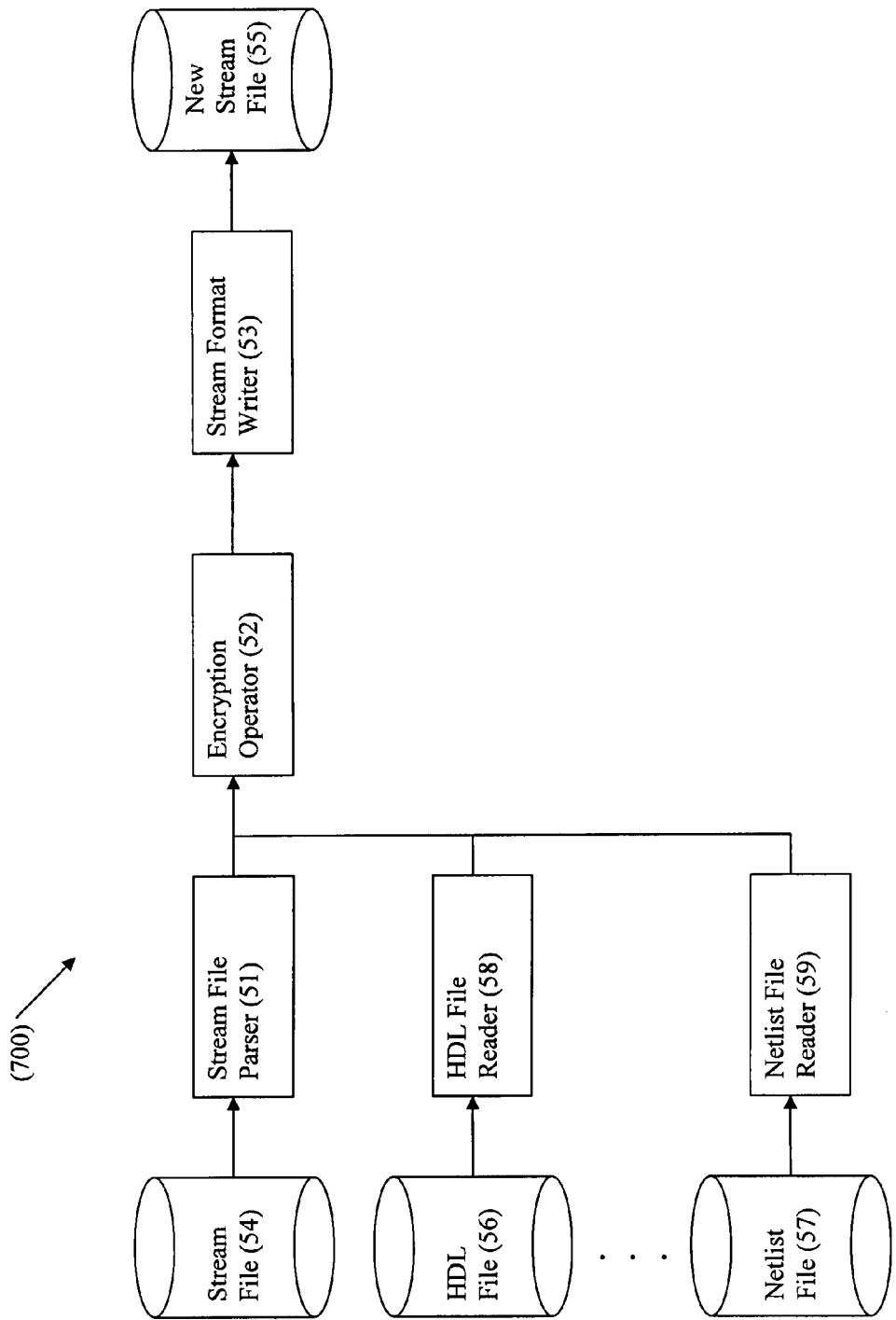
FIG. 7 is a block diagram, which shows an illustrative architecture for creating a content-encrypted silicon IP layout database from its original layout database and other circuit design files according to one embodiment of the present invention.

FIG. 7 is a block diagram 700 showing an illustrative architecture for generating content-encrypted silicon IP layout database from its original layout database and other related circuit design files according to one embodiment of the present invention. The layout database 54 is the original silicon IP layout database, which may be a GDSII file, a OASIS file or any other format layout database file. The layout database parser 51 receives and parses the layout database 54 to extract all records. The HDL file 56 includes HDL file data which is a functional description circuit design file and represents the circuit design at a higher abstraction level. The HDL file reader 58 can be a common text file reader known to those skilled in the art. The netlist file 57 includes netlist file data which is a transistor level circuit design file and is mainly for simulation usage. The netlist file reader 59 can be a common text file reader known to those skilled in the art. When all the records are extracted by the layout database parser 51, the HDL file data and the netlist file data are also passed to the encryption operator 52. The encryption operator 52 will first select structure records from the extracted records from the layout database parser 51 and then compress and encrypt the selected structure records together with the HDL file data and the netlist file data. Thereafter, the encryption operator 52 will map the data after compression and encryption to printable ASCII characters and pass the ASCII characters to the layout database writer 53. The layout database writer 53 will use the ASCII characters to create new text element records in a new structure. By replacing the processed structure records with the new structure records, the content-encrypted layout database 55 is created.

It will be appreciated the present invention is not limited to the method discussed above to combine the circuit design data in various related circuit design files into one single structure and that known to those skilled in the art, multiple structures may be created for individually holding the encrypted design information from different circuit design files without departing from the scope of the present invention.

According to various embodiments as disclosed herein, the process flows 300, 500 and 600 are used to generate the content-encrypted layout database 55 from its original layout database 54 by converting all the structure records' data in the original layout database 54 to multiple text elements in a new structure in the content-encrypted layout database 55. Thus, all the boundary layout polygons and the connection pins in the original layout database 54 may become hidden and invisible in the content-encrypted layout database 55. Even for the partial structure records encryption discussed above, certain boundary and pin layout information may also become inaccessible in the content-encrypted layout database 55. Therefore, the complete boundary layout polygons and the complete connection pins in the original layout database 54 may need to be added into the content-encrypted layout database 55, so the layout circuit block (hereinafter sometimes referred to as "BlackBlock"), represented in the content-encrypted layout database 55, can be utilized and placed in an application design. Hence, the BlackBlock's area can be measured, and the correct connections to the BlackBlock can be made, and any design rule check around the BlackBlock can be performed. Additionally, certain layout layers may also need to be added into the content-encrypted layout database 55 for blocking certain routing layers to run above the layout area of the BlackBlock.

Figure 8:
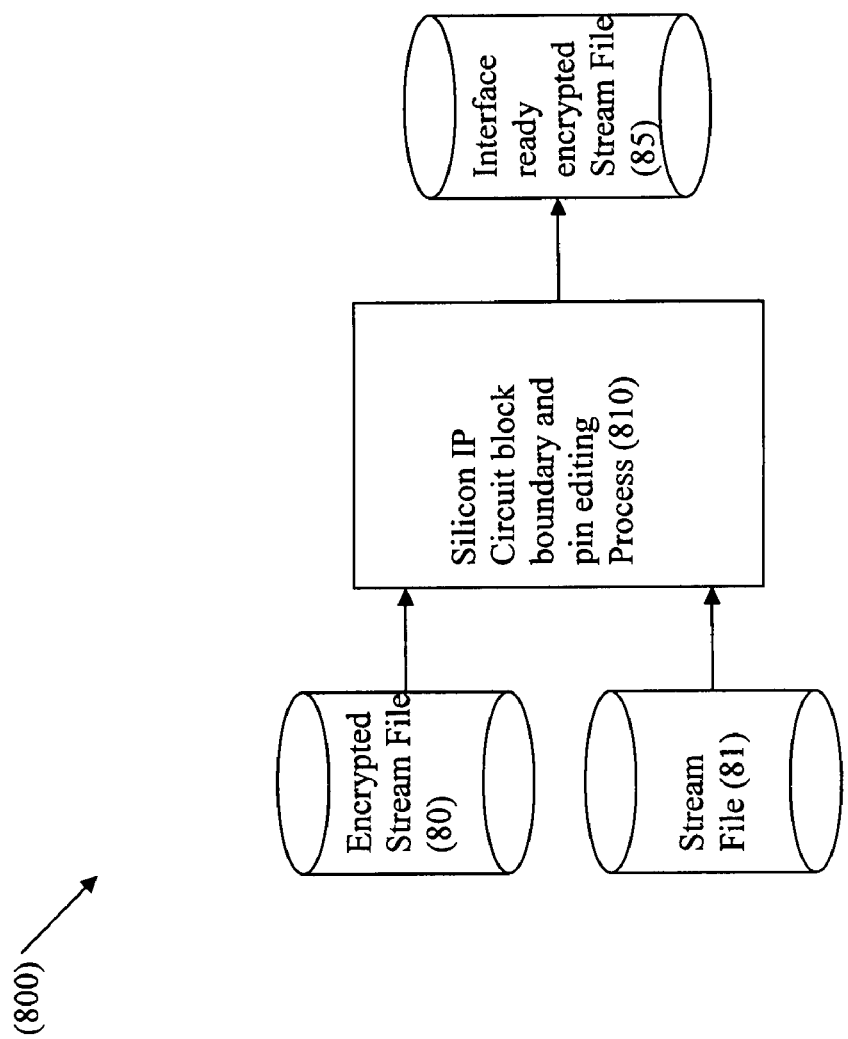
FIG. 8 is a block diagram, which shows an illustrative architecture for creating an interface-ready content-encrypted layout database.

FIG. 8 is a block diagram 800 showing an illustrative architecture for adding layout boundary polygons, blocking layer polygons and connection pins etc. into the content-encrypted layout database 55 to create an interface-ready content-encrypted layout database 85 according to one embodiment of the present invention. The silicon IP circuit block boundary and pin editing process 810 streams in the layout database 54 and the content-encrypted layout database 55; gets the boundary layout polygons and the connection pins from the layout database 54; and merges the polygons and pins into the content-encrypted layout database 55. The silicon IP circuit block boundary and pin editing process 810 may also add certain layout layers, (which may vary between different foundries), into the content-encrypted layout database 55 to block overlap layers. The interface-ready content-encrypted layout database 85 is streamed out by the silicon IP circuit block polygon editing process 810, in which the boundary polygons, blocking layer polygons, and the connection pins are combined with the encryption data from the content-encrypted layout database 55. It will be appreciated that the functionality of the silicon IP circuit block boundary and pin editing process 810 may be implemented by a layout editor. As is known to those skilled in the art, the layout editor can read in layout database files and create layout views, is capable of creating and editing polygons and pins (polygons plus labels) in layout views, and can output the content of the layout view to a layout database. An example of the layout editor is Virtuoso platform provided by Cadence Corp. of San Jose, Calif. It will be appreciated that other layout tools or functions from other electronic design automation (EDA)

companies may also be utilized to implement the functionality of the silicon IP circuit block boundary and pin editing process 810 without departing from the scope of the present invention.

Figure 9:
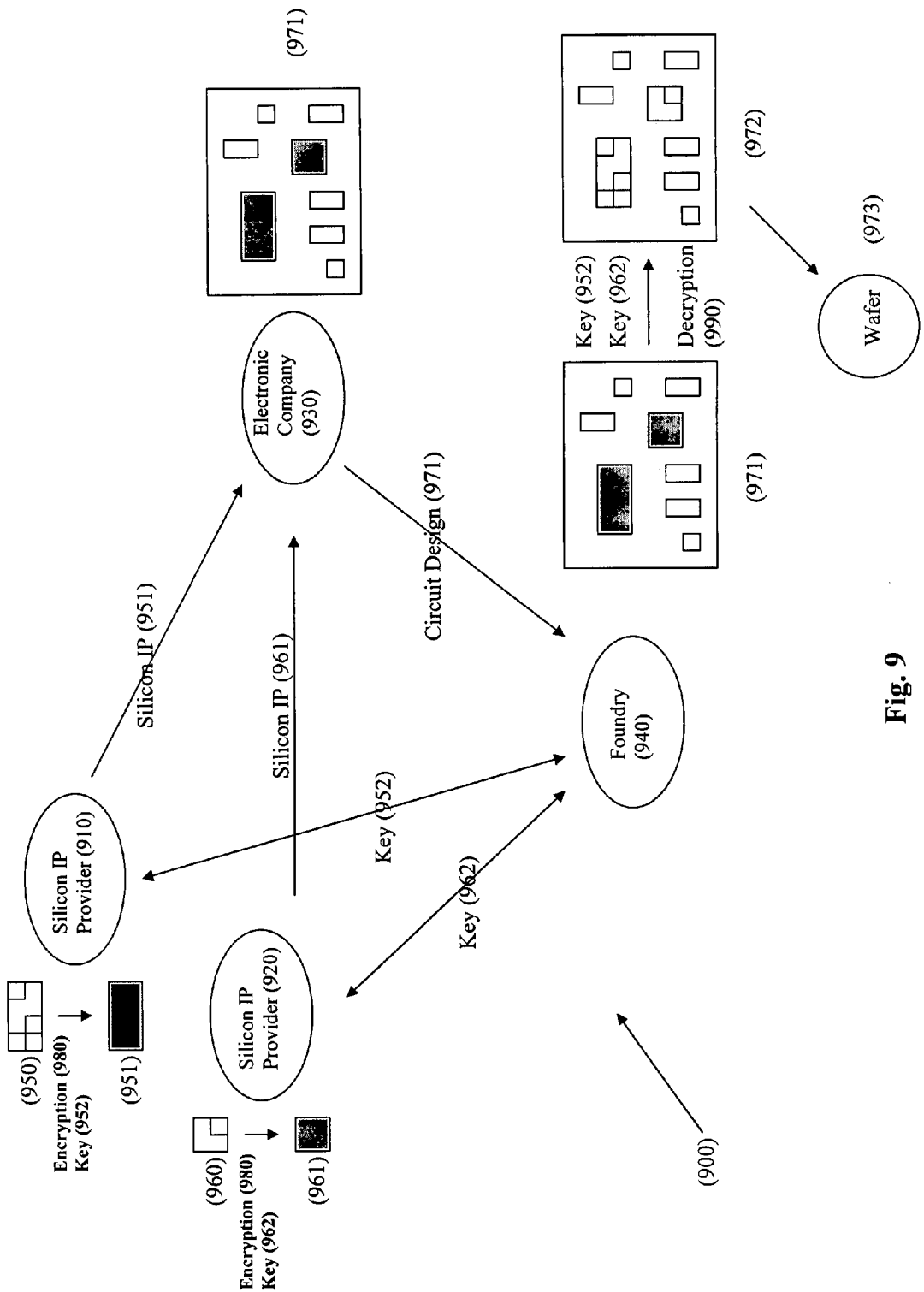
FIG. 9 is a diagram, which illustrates an IC design and manufacture flow with utilizing the present invention.

FIG. 9 is a block diagram 900 showing an IC design and manufacture flow with utilizing the present invention.

A first silicon IP provider 910 creates a silicon IP layout database 950 (the same as the layout database 54). The provider 910 then runs the software tool of the IP-Encrypt module 60 with a cryptography key 952, (the key being decided by silicon IP provider 910), to encrypt the layout database 960. And, with using the silicon IP circuit block boundary and pin editing process 810, the interface data is added to create an interface-ready content-encrypted silicon IP layout database 951 (same as the interface ready encrypted layout database 85).

A second silicon IP provider 920 creates a silicon IP layout database 960 (the same as the layout database 54). The provider 920 then runs the software tool of the IP-Encrypt module 60 with cryptography key 962, (the key being decided by silicon IP provider 920), to encrypt the layout database 960. And with using the silicon IP circuit block boundary and pin editing process 810, the interface data is added to create an interface-ready content-encrypted silicon IP layout database 961 (same as the interface ready encrypted layout database 85). While two silicon IP providers 910 and 920 are shown in FIG. 9, it is contemplated that any number of silicon IP providers may be involved in the IC design and manufacture flow 900.

An electronic company 930 desiring to create a circuit design 971, using one or more silicon IPs, acquires the silicon IPs layout database 951 and 961 from the silicon IP providers 910 and 920. The electronic company 930 then incorporates the silicon IPs layout database 951 and 961 into the circuit design 971. When the electronic company 930 has completed the circuit design 971 to a point where it is ready for fabrication, the electronic company 930 delivers the circuit design 971 to a foundry 940.

Before fabrication, the foundry 940 finds that the silicon IPs layout database 951 and 961 in the circuit design 971 which need to be restored to their real circuit layout as presented in the original silicon IPs layout database 950 and 960. The foundry 940 sends requests to the silicon IP providers 910 and 920 to ask for the decryption keys. When the silicon IP providers 910 and 920 get the request and confirm the electronic company 930 is a legal user, they send the cryptography keys 952 and 962 to the foundry 940. The foundry 940 then runs the decryption tool IP-Decrypt 990 with the cryptography keys 952 and 962 to restore the circuit design 971 to a new circuit design 972, in which each of the interface-ready content-encrypted silicon IP layout database is restored to their real circuit layout. The new circuit design 972 then is used to create all the photo masks for manufacturing the chip wafer 973.

The decryption tool IP-Decrypt 990 is a computer software system, which restores the original layout content from the encrypted circuit blocks by accordingly reversing the encrypting process flow described in the present invention.

First the decryption tool IP-Decrypt 990 reads in the layout database and parses it to get all the records. Then the decryption tool IP-Decrypt 990 discovers the encrypted records by checking the type and data content of each record. The records, which construct text elements written on special layer, such as (63:64) discussed above at step 630 in the process flow 600, are decided to be the encrypted records. The BGNSTR 430 type record, the STRNAME 431 type record and the ENDSTR type record are also decided to be the encrypted records if records between them are all encrypted records. As is known to those skilled in the art, there may be other ways to decide the encrypted records, such as by judging from the structure name, etc. All the encrypted records need to be replaced by their decrypted data when written out to a new layout database, all other records are directly written out to the new layout database.

The decrypted data of the encrypted records is generated with following the steps described as below. First, the text elements constructed by the encrypted records are found. Next, the string contents of the found text elements are collected in a memory array by following the coordinate sequence of the text elements. Next, the collected data in the memory array is mapped back to binary bytes by back tracking the mapping process discussed at step 535 in the process flow 500. Next, the mapped back data is decrypted with the corresponding decryption algorithm, referring to the encryption algorithm at step 530 in the process flow 500. Finally, the decrypted data is uncompressed with the corresponding uncompressing function, referring to the compressing function at step 520 in the process flow 500. The implement of the decryption tool IP-Decrypt 990 is quite dependent on the implemented method of the encryption tool IP-Encrypt 60. The encryption tool IP-Encrypt module 60 and the decryption tool IP-Decrypt 990 need to be provided as a set of tools in the IC design and manufacture flow 900. The decryption tool IP-Decrypt 990 is simply the reverse process of the encryption tool.

Software is known, in one form or another (e.g., program, procedure, process, application, module, logic, and so on) as taking an action or causing a result. Such expressions are merely a shorthand way of stating the execution of the software by a processing system to cause the processor to perform an action or produce a result.

In view of the foregoing, it will be appreciated that the present invention provides a method and system for protecting silicon IPs from unauthorized use by encrypting the layout content of silicon IPs with a strong cryptography algorithm. While the invention has been particularly shown and described with reference to illustrative embodiments thereof, it will be understood by those skilled in the art that various other changes in the form and details may be made therein without departing from the spirit and scope of the present invention.

What is claimed is:

1. A method of protecting data and forming an encrypted silicon IP layout database comprising:
    a computer comprising a processor, a memory, and a bus connecting the memory to the processor;
    the processor parsing a layout database representative of a silicon intellectual property (IP) to form a set of records;
    the processor encrypting data content of portions of said set of records to a binary data array and mapping said binary data array into printable American Standard Code for Information Interchange (ASCII) characters;
    the processor building encrypted text element records from said ASCII characters and the processor integrating said encrypted text element records with said set of records to form an encrypted silicon IP layout database.

2. The method of claim 1, wherein the parsing step includes parsing the layout database having a Graphic Data System II, Open Artwork Systems Interchange Standard, or other format layout database file physically on a magnetic storage device.

3. The method of claim 1, further comprising, after the parsing step:
    converting to text element records from other related circuit design files; and integrating the text element records into the encrypted silicon IP layout database.

4. The method of claim 3, wherein the converting step includes converting functional hardware description language files to the text element records.

5. The method of claim 3, wherein the converting step further includes converting simulation netlist files to the text element records.

6. The method of claim 1, wherein the parsing step comprises parsing a hierarchy of structures, each structure containing elements, the elements may include boundary polygon, path, text, box, structure references, structure array references, and the elements are situated on layers.

7. The method of claim 1, wherein the parsing step comprises extracting two dimensional graphical design data from records contained in a format layout database, the two dimensional graphical design data is representative of data used by a fabrication factory to generate photography masks used in manufacturing integrated circuit chips.

8. The method of claim 1, further comprising the steps of:
adding layout boundary polygons, blocking layer polygons and connection pins into the encrypted silicon IP layout database to create an interface-ready content-encrypted layout database.

9. The method of claim 8, wherein the adding step comprises:
streaming in the layout database file representative of the silicon IP used in wafer fabrication and the encrypted silicon IP layout database;
getting the layout boundary polygons and the connection pins of the layout database file;
getting foundry specific layout layers for blocking overlap layers to form blocking layer polygons; and
merging the layout boundary polygons, the blocking layer polygons and the connection pins into the encrypted silicon IP layout database.

10. A non-transitory computer program product having stored there upon processor executable instructions to cause the computer processor to perform operations comprising to:
program instructions causing the computer to parse a layout database representative of a silicon intellectual property (IP) to form a set of records;
program instructions to encrypt data content of portions of said set of records to a binary data array and to map said binary data array into printable American Standard Code for Information Interchange (ASCII) characters;
program instructions causing the computer to build encrypted text element records from said ASCII characters and to integrate said encrypted text element records with said set of records to form an encrypted silicon IP layout database.

11. The computer program product of claim 10, wherein the layout database has a Graphic Data System II, Open Artwork Systems Interchange Standard, or other format layout database file.

12. The computer program product of claim 10, further comprising instructions to cause the computer, after parsing, to:
convert to text element records from other related circuit design files; and
integrate the text element records into the encrypted silicon IP layout database.

13. The computer program product of claim 12, wherein the other related circuit design files includes functional hardware description language files.

14. The computer program product of claim 12, wherein the other related circuit design files includes simulation netlist files.

15. The computer program product of claim 10, wherein the instructions for causing the computer to parse includes instructions to cause the computer to parse a hierarchy of structures, each structure containing elements, the elements may include boundary polygon, path, text, box, structure references, structure array references, and the elements are situated on layers.

16. The computer program product of claim 10, wherein the instructions for causing the computer to parse includes instructions to cause the computer to extract two dimensional graphical design data from records contained in a format layout database, the two dimensional graphical design data is representative of data used by a fabrication factory to generate photography masks used in manufacturing integrated circuit chips.

17. The computer program product of claim 10, further comprising instructions for causing the computer to:
add layout boundary polygons, blocking layer polygons and connection pins into the encrypted silicon IP layout database to create an interface-ready content-encrypted layout database.

18. The computer program product of claim 17, wherein the instructions for causing the computer to add comprises instructions to cause the computer to:
stream in the layout database file representative of the silicon IP used in wafer fabrication and the encrypted silicon IP layout database;
get the layout boundary polygons and the connection pins of the layout database file;
get foundry specific layout layers for blocking overlap layers to form blocking layer polygons; and
merge the layout boundary polygons, the blocking layer polygons and the connection pins into the encrypted silicon IP layout database.

19. A computerized system of protecting data and forming an encrypted silicon IP layout database comprising:
a computer comprising a processor, a memory, and a bus connecting the memory to the processor;
means for parsing a layout database representative of a silicon intellectual property (IP) to form a set of records;
means for encrypting data content of portions of said set of records to a binary data array and mapping said binary data array into printable American Standard Code for Information Interchange (ASCII) characters;
means for building encrypted text element records from said ASCII characters and integrating said encrypted text element records with said set of records to form an encrypted silicon IP layout database.

20. The computerized system of claim 19, wherein the layout database has a Graphic Data System II, Open Artwork Systems Interchange Standard, or other format layout database file physically on a magnetic storage device.

21. The computerized system of claim 19, wherein the further comprising:
means for converting to text element records from other related circuit design files; and
means for integrating the text element records into the encrypted silicon IP layout database.

22. The computerized system of claim 21, wherein the other related circuit design files includes functional hardware description language files.

23. The computerized system of claim 21, wherein the other related circuit design files includes simulation netlist files.

24. The computerized system of claim 19, wherein the parsing means comprises means for parsing a hierarchy of structures, each structure containing elements, the elements may include boundary polygon, path, text, box, structure references, structure array references, and the elements are situated on layers.

25. The computerized system of claim 19, wherein the parsing means comprises means for extracting two dimensional graphical design data from records contained in a format layout database, the two dimensional graphical design data is representative of data used by a fabrication factory to generate photography masks used in manufacturing integrated circuit chips.

26. The computerized system of claim 19, further comprising:
   means for adding layout boundary polygons, blocking layer polygons and connection pins into the encrypted silicon IP layout database to create an interface-ready content-encrypted layout database.

27. The computerized system of claim 26, wherein the adding means comprises:
   means for streaming in the layout database file representative of the silicon IP used in wafer fabrication and the encrypted silicon IP layout database;
   means for getting the layout boundary polygons and the connection pins of the layout database file;
   means for getting foundry specific layout layers for blocking overlap layers to form blocking layer polygons; and
   means for merging the layout boundary polygons, the blocking layer polygons and the connection pins into the encrypted silicon IP layout database.

28. A computerized system of protecting data and forming an encrypted silicon IP layout database comprising: a computer comprising a processor, a memory, and a bus connecting the memory to the processor;
   a layout database parser operative to parse a layout database representative of a silicon intellectual property (IP) to form a set of records;
   encryption operator operative to encrypt data content of portions of said set of records to a binary data array and mapping said binary data array into printable American Standard Code for Information Interchange (ASCII) characters;
   a layout database writer operative to build encrypted text element records from said ASCII characters and to integrate said encrypted text element records with said set of records to form an encrypted silicon IP layout database.

29. The computerized system of claim 28, wherein the layout database has a Graphic Data System II, Open Artwork Systems Interchange Standard, or other format layout database file physically on a magnetic storage device.

30. The computerized system of claim 28, wherein the encryption operator is further operative to convert to text element records from other related circuit design files and integrating the text element records into the encrypted silicon IP layout database.

31. The computerized system of claim 30, wherein the other related circuit design files includes functional hardware description language files.

32. The computerized system of claim 30, wherein the other related circuit design files includes simulation netlist files.

33. The computerized system of claim 28, wherein the layout database parser is operative to parse a hierarchy of structures, each structure containing elements, the elements may include boundary polygon, path, text, box, structure references, structure array references, and the elements are situated on layers.

34. The computerized system of claim 28, wherein the layout database parser is operative to extract two dimensional graphical design data from records contained in a format layout database, the two dimensional graphical design data is representative of data used by a fabrication factory to generate photography masks used in manufacturing integrated circuit chips.

35. The computerized system of claim 28, further comprising:
   a silicon IP circuit block boundary and pin editing module operative to add layout boundary polygons, blocking layer polygons and connection pins into the encrypted silicon IP layout database to create an interface-ready content-encrypted layout database.

36. The computerized system of claim 35, wherein the silicon IP circuit block boundary and pin editing module is operative to: stream in the layout database file representative of the silicon IP used in wafer fabrication and the encrypted silicon IP layout database; get the layout boundary polygons and the connection pins of the layout database file; get foundry specific layout layers for blocking overlap layers to form blocking layer polygons; and merge the layout boundary polygons, the blocking layer polygons and the connection pins into the encrypted silicon IP layout database.

37. A method of protecting data and utilizing encrypted silicon IP layout databases comprising:
   a network system comprising multiple computers locating at silicon IP providers and electric companies, each computer has a processor, a memory, and a bus connecting the memory to the processor
   the processor locating at at least one silicon IP provider creating an interface-ready content-encrypted layout database with using a cryptographic key associated with the provider from an original IP layout database
   the processor locating at an electric company receiving the interface-ready content-encrypted silicon IP layout database from the at least one provider;
   the processor locating at the electric company incorporating the interface-ready content-encrypted silicon IP layout database of at least one provider into a circuit design;
   the processor locating at the electric company delivering the circuit design to a foundry for fabrication;
   the processor locating at the foundry, before fabrication, finding the interface-ready content-encrypted silicon IP layout database for the at least one provider;
   the processor locating at the foundry restoring the original silicon IP layout database with using a decryption key associated with the cryptographic key from the at least one provider.

38. The method of claim 37, further comprising,
   the processor locating at the foundry, before fabrication, receiving confirmation from at least one IP provider that the electric company is a legal user;
   the processor locating at the foundry receiving the cryptography key from the IP provider;
   the processor locating at the foundry decrypting the interface-ready content-encrypted silicon IP layout database with the cryptography key to restore the original silicon IP layout database to create a new circuit design.

39. The method of claim 37, wherein the creating step by the processor locating at at least one silicon IP provider includes
   the processor creating an original silicon IP layout database;

the processor parsing the original silicon IP layout database to form a set of records;

the processor converting portions of said set of records to encrypted text element records;

the processor integrating said encrypted text element records with said set of records form a content-encrypted silicon IP layout database;

the processor adding layout boundary polygons, blocking layer polygons and connection pins into the content-encrypted silicon IP layout database to create an interface-ready content-encrypted layout database.

40. A method of protecting data and forming an encrypted silicon IP layout database comprising:

a computer comprising a processor, a memory, and a bus connecting the memory to the processor;

the processor parsing a layout database representative of a silicon intellectual property (IP) to form a set of records;

the processor converting portions of said set of records to encrypted text element records;

the processor integrating said encrypted text element records with said set of records to form an encrypted silicon IP database.

* * * * *